United States Patent [19]

Tal et al.

[11] Patent Number: 5,050,362
[45] Date of Patent: Sep. 24, 1991

[54] CONSTRUCTIONAL PANELS

[75] Inventors: Danny Tal; Gilad Hakim; Haim Hakim, all of Kibbutz Ramat Hashofet, Israel

[73] Assignee: Polygal, Kibbutz Ramat Hashofet, Israel

[21] Appl. No.: 465,722

[22] Filed: Jan. 17, 1990

[30] Foreign Application Priority Data

Jan. 19, 1989 [IL] Israel ............................ 89005

[51] Int. Cl.$^5$ ............................................ E04C 3/00
[52] U.S. Cl. .................................... 52/588; 52/547; 52/579; 404/41
[58] Field of Search .................. 52/588, 547, 536, 538, 52/579; 404/40, 41, 34, 35

[56] References Cited

U.S. PATENT DOCUMENTS

| 1,913,342 | 7/1930 | Schaffert . | |
|---|---|---|---|
| 3,062,338 | 3/1960 | DeRidder . | |
| 3,128,851 | 4/1964 | Deridder et al. | 52/588 |
| 3,172,508 | 1/1962 | Doering et al. . | |
| 3,182,763 | 5/1961 | Glaser . | |
| 3,182,769 | 5/1961 | DeRidder . | |
| 3,186,525 | 7/1961 | Gresham et al. . | |
| 3,191,724 | 5/1961 | DeRidder . | |
| 3,214,889 | 8/1961 | Webster . | |
| 3,236,017 | 2/1966 | Doering | 52/579 |
| 3,308,595 | 7/1964 | Markow . | |
| 3,368,315 | 2/1968 | Thurnau | 52/588 |
| 3,385,182 | 5/1968 | Harvey | 52/588 X |
| 3,388,518 | 6/1968 | Scott | 52/547 X |
| 3,397,496 | 2/1965 | Sohns . | |
| 3,487,756 | 3/1968 | Glaza et al. . | |
| 3,538,819 | 7/1968 | Gould . | |
| 3,564,801 | 2/1971 | Huerta | 52/588 X |
| 3,760,548 | 10/1971 | Sauer et al. . | |
| 3,815,311 | 3/1972 | Nisula et al. . | |
| 3,984,961 | 10/1976 | Chieger et al. | 52/579 X |
| 4,104,837 | 7/1977 | Naito . | |
| 4,267,679 | 2/1979 | Thompson . | |
| 4,438,614 | 12/1980 | Raith et al. . | |
| 4,542,614 | 12/1982 | Malachowski . | |
| 4,644,724 | 4/1985 | Schijf . | |
| 4,646,502 | 2/1985 | Ziehbrunner . | |
| 4,727,701 | 3/1988 | Figari | 52/588 X |
| 4,738,067 | 4/1988 | Froseth | 52/588 X |
| 4,744,185 | 1/1986 | Lambert et al. . | |
| 4,790,112 | 12/1988 | Wang | 52/588 X |
| 4,819,398 | 10/1987 | Dameron . | |
| 4,826,351 | 11/1987 | Haberhauer . | |
| 4,852,317 | 10/1987 | Schiavello et al. . | |
| 4,904,508 | 2/1980 | Madonia | 49/462 X |

FOREIGN PATENT DOCUMENTS 1509652 1/1968 France ............................ 52/588

OTHER PUBLICATIONS

Product Sheet. Rodeca GmbH of West Germany. (In German)

*Primary Examiner*—Philips C. Kannan
*Attorney, Agent, or Firm*—Hedman, Gibson, Costigan & Hoare

[57] ABSTRACT

A construction panel having first and second edge portions arranged for interconnection with respective second and first edge portions of similar panels, the first and second edge portions being configured for mating engagement at at least two locations, the first edge portion including a generally flat portion arranged to permit attachment of the edge portion to an external support by a fastener extending through the flat portion, the mating engagement of the first and second edge portions being such that the generally flat portions and the fastener are covered by the second edge portion.

13 Claims, 7 Drawing Sheets

CONSTRUCTIONAL PANELS

FIELD OF THE INVENTION

The present invention relates generally to modular, constructional elements and, in particular, to lightweight panels such as may be used for roofing and the like.

BACKGROUND OF THE INVENTION

There are known in the patent literature various types of interlocking plastic constructional panels, such as used for roofing. Examples of such panels appear in the following U.S. Pat. Nos. 4,790,112; 1,913,342; 3,062,338; 3,191,724; 3,236,017; 3,186,525; 3,172,508; 3,182,769; 3,984,961; 4,644,724; and 3,385,182. The panels illustrated and described in the above-mentioned patents have a great variety of constructional features, each having a specific purpose. U.S. Pat. No. 4,790,112 is particularly relevant in that it describes a non-uniform thickness interlocking panel which permits screw connection to an external support. However, a cap member is required to cover the screws.

SUMMARY OF THE INVENTION

The present invention seeks to provide a lightweight, modular constructional panel intended for connection to a similar adjoining panel by means of a connection having a moment resistance capability comparable to that of the panels, wherein the connection also includes a facility for bolt or other connection to a support element such as a roof purlin, and wherein the connection does not protrude from the general plane of the panel.

There is thus provided in accordance with a preferred embodiment of the present invention a constructional panel having first and second edge portions arranged for interconnection with respective second and first edge portions of similar panels, the first and second edge portions being configured for mating engagement at at least two locations, the first edge portion including a generally flat portion arranged to permit attachment of the edge portion to an external support by a fastener extending through the flat portion, the mating engagement of the first and second edge portions being such that the generally flat portion and the fastener are covered by the second edge portion.

There is also provided a panel construction including a plurality of constructional panels, each having first and second edge portions arranged for interconnection with respective second and first edge portions of similar panels, the first and second edge portions being configured for mating engagement at at least two locations, the first edge portion including a generally flat portion arranged to permit attachment of the edge portion to an external support and a plurality of fasteners extending through the flat portions of the plurality of constructional panels and mounting them onto an external support, adjacent panels being in mating engagement being such that the generally flat portion and the fastener are covered by the second edge portion.

Further in accordance with a preferred embodiment of the present invention, the panel includes first and second spaced apart portions defining respective first and second outer surfaces lying in respective first and second planes, the first edge portion having a third outer surface substantially coplanar with the first surface and the second edge portion having a fourth outer surface substantially coplanar with the second outer surface.

Still further in accordance with a preferred embodiment of the present invention, the first edge portion defines a first protrusion defining the third outer surface, the first protrusion also defining first and second lacking portions and the second edge portion defines a second protrusion defining the fourth outer surface and a pair of spaced apart teeth mounted onto the second protrusion so as to extend transversely to the second plane and towards the first plane and so as to be lockably engageable with the first and second locking portions, thereby to define the at least two locations.

Additionally in accordance with a preferred embodiment of the present invention, the first and second locking portions are defined by a pair of spaced apart teeth mounted onto the first protrusion so as to extend transversely to the first plane and towards the second plane and a pair of protrusions mounted in spaced relation to the pair of spaced apart teeth, such that each locking portion is defined by one of the spaced apart teeth, an adjacent one of the pair of protrusions, and an intervening transverse surface.

Still further in accordance with a preferred embodiment of the present invention, the resistance of the first and second edge portions to decoupling as a result of relative rotation thereof is at least equal to the resistance to moments of the constructional and similar panels.

Further in accordance with a preferred embodiment of the present invention, the attachment of the edge portion to the external support is substantially impermeable to the passage of liquids.

Still further in accordance with a preferred embodiment of the present invention, the panels define substantially parallel, flat, outward-facing surfaces.

Additionally in accordance with a preferred embodiment of the present invention, the panel or panel construction is resistant to ultra violet radiation.

BRIEF DESCRIPTION OF THE DRAWINGS

The present invention will be understood and appreciated more fully from the following description, taken in conjunction with the drawings, in which.

DETAILED DESCRIPTION OF THE INVENTION

Figure 1:
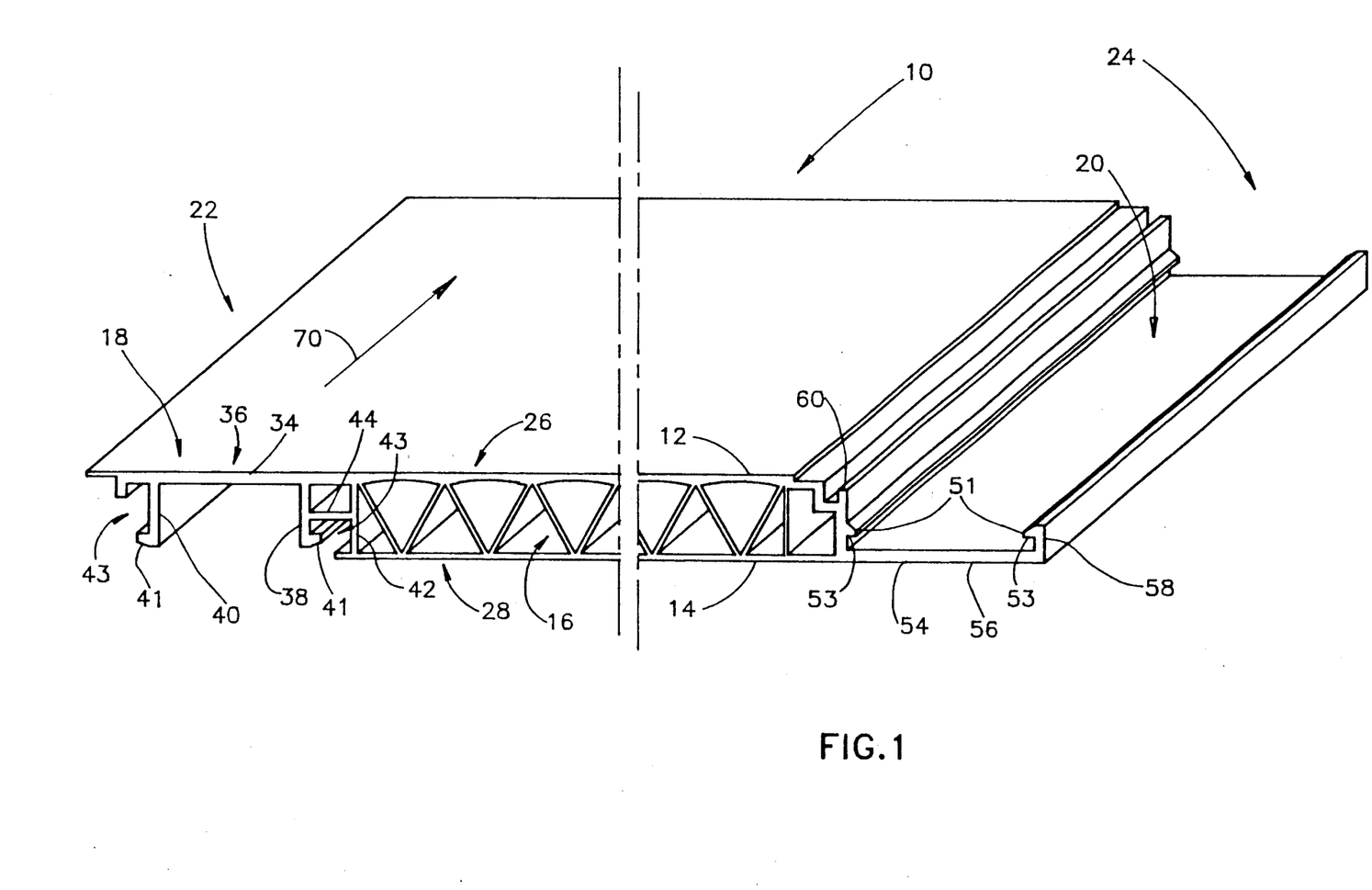
FIG. 1 shows a constructional panel constructed in accordance with a preferred embodiment of the invention.
Figure 2A:
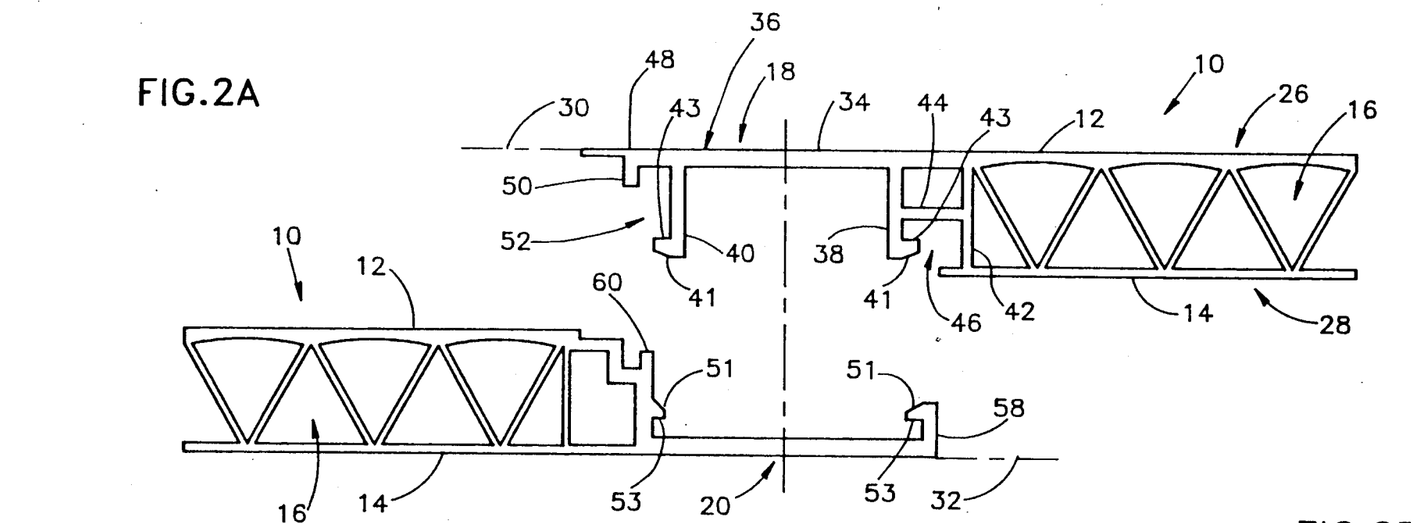
FIGS. 2A and 2B show a connection between a pair of panels as shown in FIG. 1, before and after assembly.
Figure 2B:
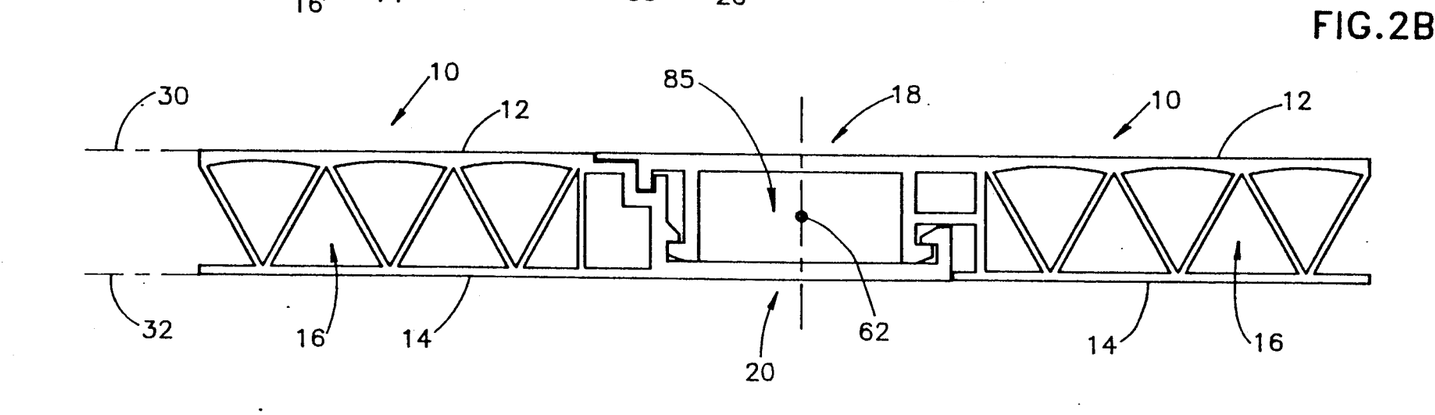

Reference is made to FIGS. 1–2B, in which there is shown a lightweight, modular, constructional panel, referenced generally 10, constructed in accordance with a preferred embodiment of the invention. According to the shown embodiment, panel 10 comprises first and second parallel, planar elements 12 and 14, connected by a crane-beam type intervening construction, referenced generally 16.

Panel 10 is preferably made from plastic, such as polycarbonate or acrylic, and may be made in a range of thicknesses, typically ranging from about 10 mm to about 50 mm. A typical panel may have a width of up to about 1.25 m.

Panel 10 defines first and second connector portions, respectively referenced 18 and 20, associated with first and second edge portions, respectively referenced 22 and 24. As will be appreciated, particularly with reference to FIGS. 2A and 2B, the first and second connector portions are configured for mutual engagement and are associated with respective first and second planar elements 12 and 14.

Planar elements 12 and 14 define respective first and second outward-facing surfaces 26 and 28 which are arranged along respective first and second planes 30 and 32 (FIGS. 2A and 2B). The first connector portion 18 comprises a first protrusion 34 (FIGS. 1 and 2A) defining a first outward-facing surface 36, which is arranged along first plane 30 and constitutes a continuation of surface 26. First protrusion 34 defines a first pair of transversely oriented teeth 38 and 40, extending towards second planar element 14, each of the teeth defining an outward facing pawl 41 defining a surface 43, as shown, substantially parallel to first plane 30.

Figure 3A:
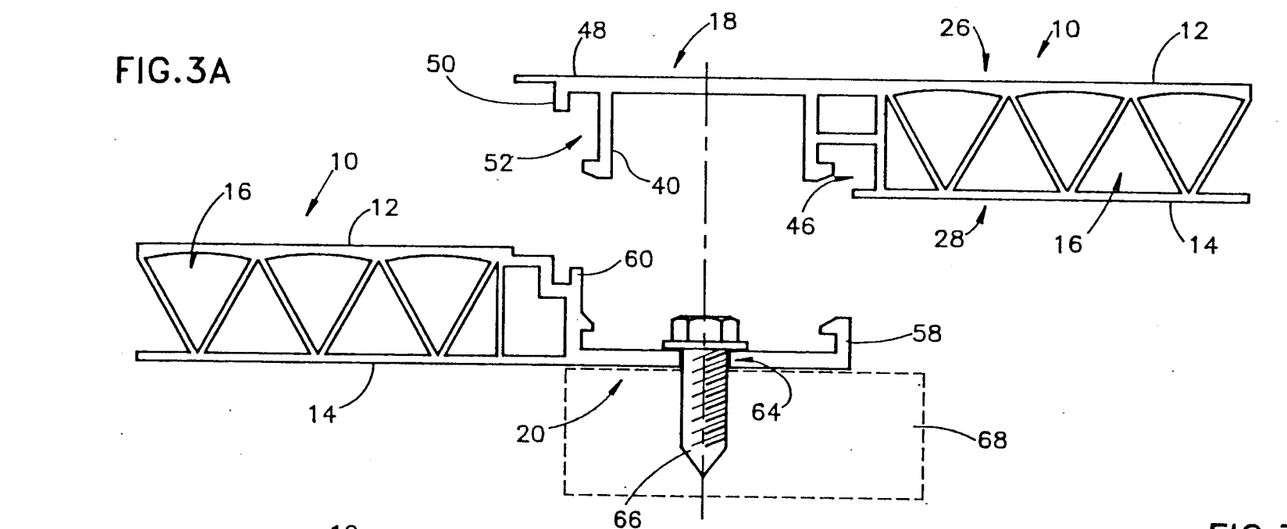
FIGS. 3A and 3B are similar to FIGS. 2A and 2B and also show a bolt for connection to a support element.

Tooth 38 is spaced from an end element 42 connecting between planar elements 12 and 14 by means of a support element 44 connected at right angles to end element 42, so as to define a first locking portion 46 (FIG. 3A). As shown in FIG. 3A, tooth 40 defines, together with an outwardly-extending edge portion 48 of planar element 12 and a small protrusion 50, a second locking portion 52.

The second connector portion 20 comprises a second protrusion 54 (FIG. 1) defining a second outward-facing surface 56, which is arranged along second plane 32 and constitutes a continuation of plane 32. Second protrusion 54 defines a second pair of transversely oriented teeth 58 and 60, extending towards first planar element 12, each of the teeth defining an outward facing pawl 51 defining a surface 53, as shown, substantially parallel to second plane 32.

It will be appreciated that as the first and second connector portions are assembled, the respective pawl surfaces 43 and 53 abut each other, and, as second teeth 58 and 60 are configured to fit tightly into first and second locking portions 46 and 52, teeth 58 and 60 thus become respectively lockably engaged therewith.

Furthermore, as is shown particularly in FIG. 2B, the inward facing surfaces defined by each of connector portions 18 and 20 become totally locked against each other so as to define a connection which is highly resistant to both clockwise and counterclockwise moments applied about a connection axis 62 (FIG. 2B) which is parallel to an axis of the panel 10 extending generally in the direction of arrow 70 (FIG. 1) Moreover, it has been found by the applicants that the connection can resist moments of approximately the same magnitude as the panel itself can resist.

Figure 3B:
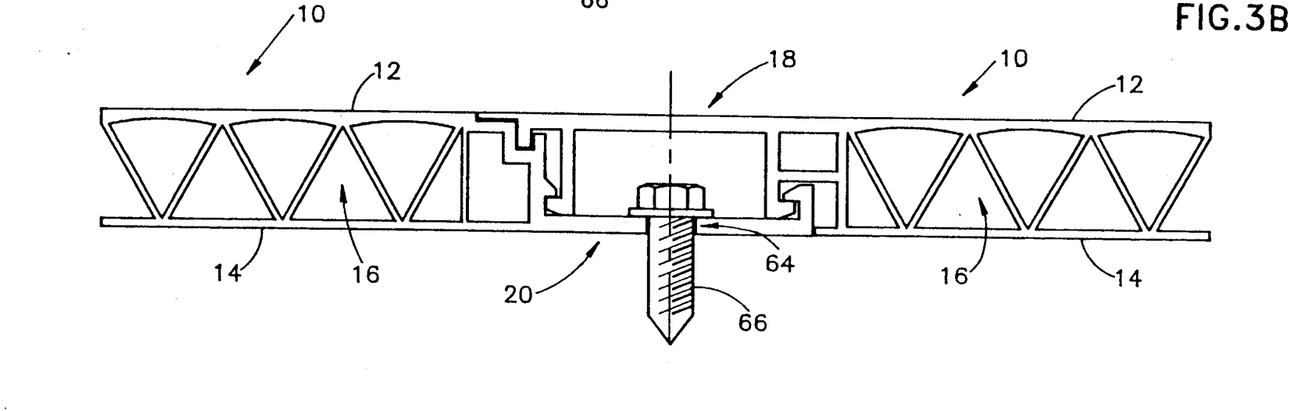

Reference is now made briefly to FIGS. 3A and 3B, in which there is shown a connection similar to that shown in FIGS. 2A and 2B, but wherein second protrusion 54 includes a hole 64 for a bolt 66, by which the panel can be connected to a support element 68, such as a roof purlin. It will be appreciated that as the connection extends over a relatively large distance in the direction shown generally by arrow 70 in FIG. 1, provision of a relatively small number of holes along the length of the connection does not weaken it appreciably.

Figure 4A:
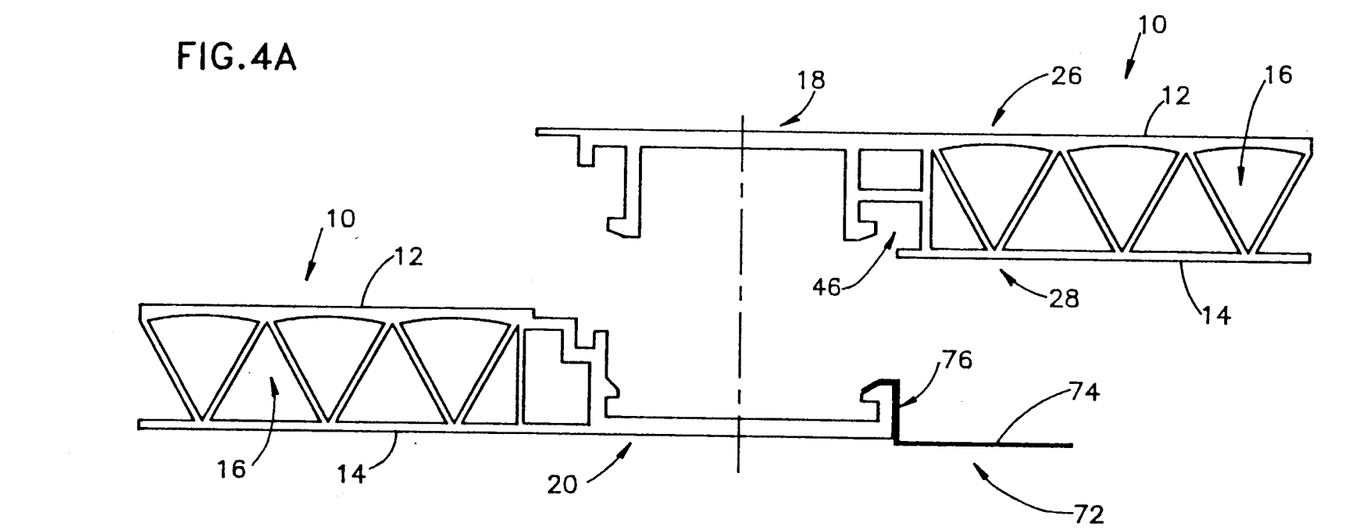
FIGS. 4A and 4B are similar to FIGS. 2A and 2B and also show a plate metal element for connection to a support element.
Figure 4B:
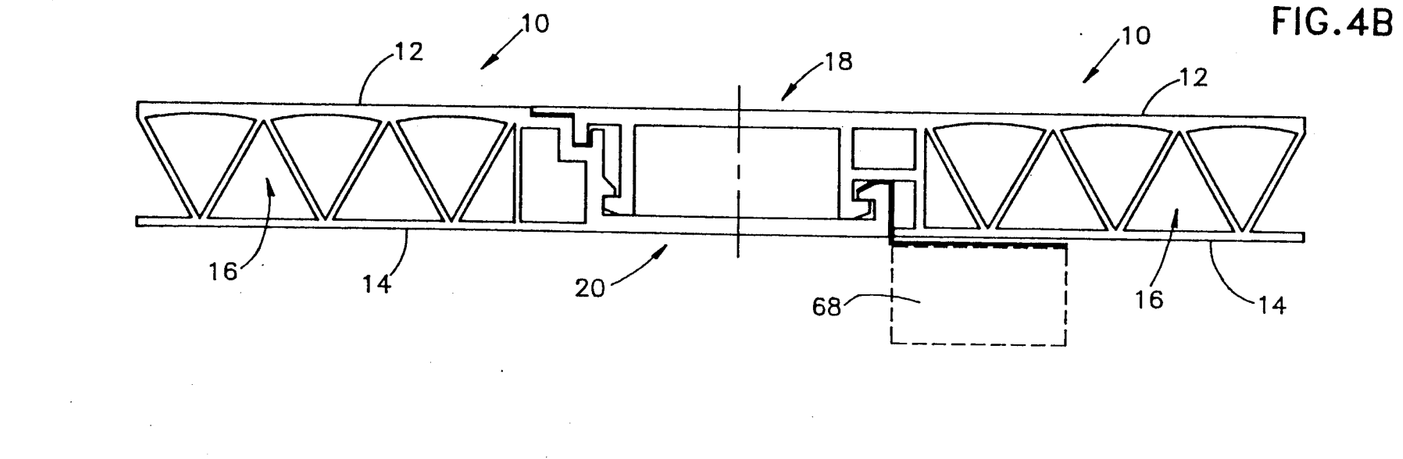
Figure 4C:
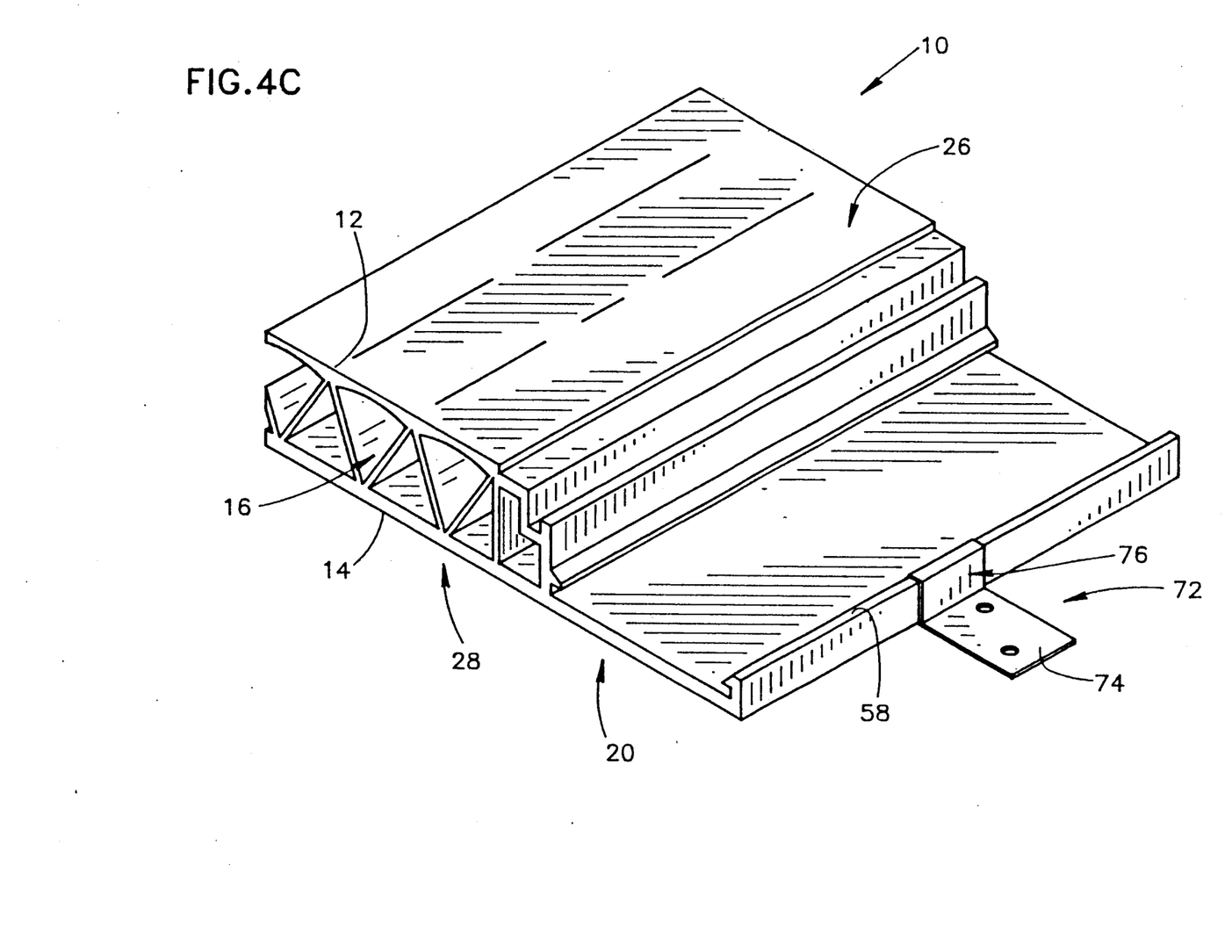
FIG. 4C is an isometric view of a portion of the connection as shown in FIG. 4A.

Reference is now made to FIGS. 4A–4C, in which there is shown an alternative way of attachment to support element 68. In the shown embodiment, a plate metal element 72 defines a flat portion 74 for attachment to support element 68 and a portion 76 bent so as to fit around tooth 58. Once the connection is assembled, therefore, portion 76 of the metal element 72 is rigidly locked within first locking portion 46.

Figure 5:
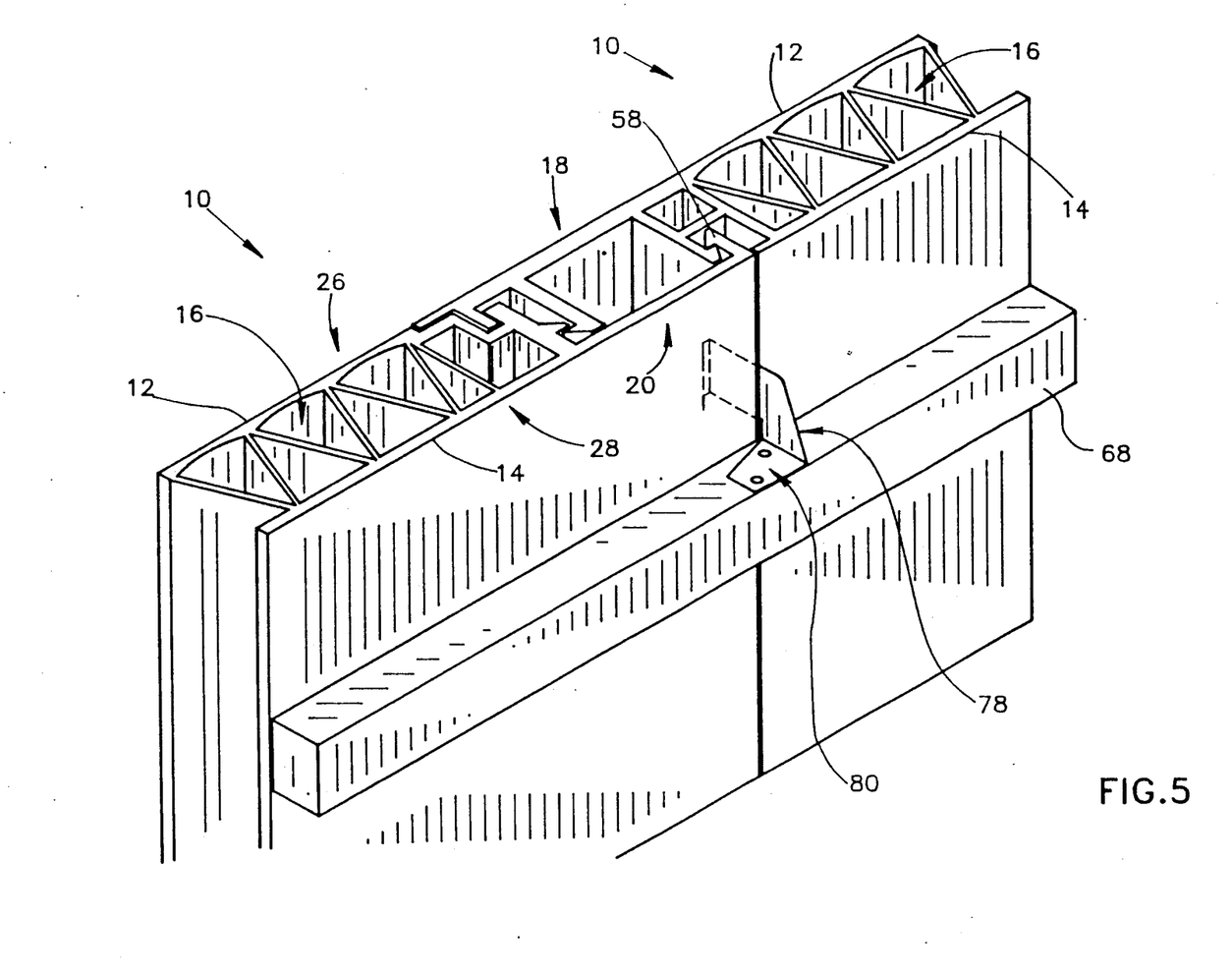
FIG. 5 is a view similar to that shown in FIG. 4C, but wherein the plate metal element has an alternative configuration.

Shown in FIG. 5 is a plate metal element 78, similar to element 72, but having an angled portion 80 for side connection to support element 68, rather than the flat portion 74 of element 72.

Figure 6:
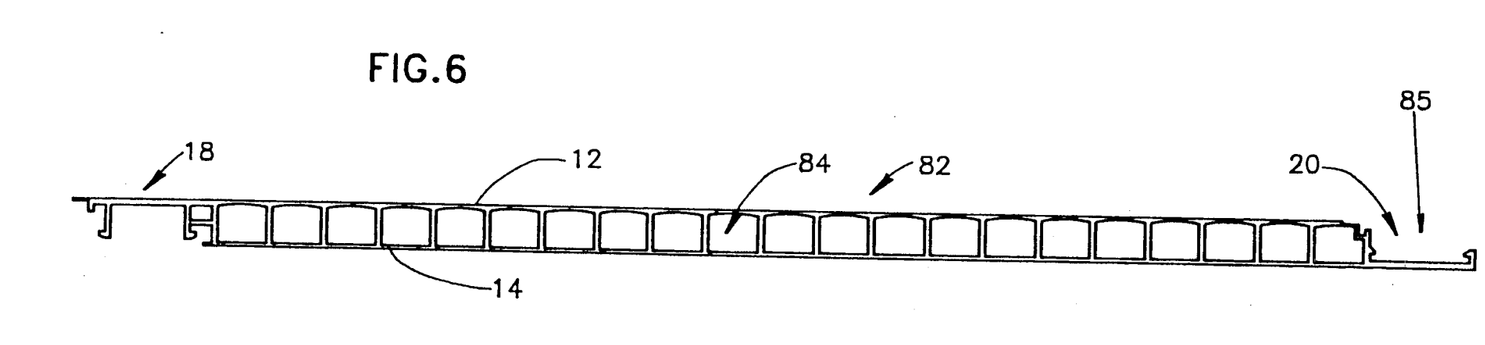
FIG. 6 is an end elevation of a constructional panel constructed in accordance with an alternative embodiment of the invention.

Referring now briefly to FIG. 6, there is shown a panel, referenced generally 82, which is similar to panel 10 described above in conjunction with FIGS. 1–5, except that panel 82 has a box-beam type construction, referenced generally 84, serving to connect elements 12 and 14.

It will be appreciated by persons skilled in the art that the construction intervening between elements 12 and 14 may have, in addition to the crane-beam and box-beam type configurations, any other configuration having suitable strength characteristics.

A further inherent feature of the panel of present invention is that the connection between two adjoining panels is substantially watertight. This is due not only to the tight fit between the two connector portions 18 and 20 and the complicated path along which water would have to travel in order to permeate from first surface 26 to second surface 28, but also to the internal channel configuration, shown generally at 85, defined internally of the connection. As a usual orientation of a construction using panels 10 or 82 of the invention is so as to define a slope along the connection axis 62, water permeating from first surface 26, past locking portion 52 and into channel 85 would flow therealong in the direction of the slope and drain out.

According to one embodiment of the invention, each of the panels shown in and described in conjunction with FIGS. 1–6 includes an ultra violet light resistant material. Such a material is manufactured under the trade name Tinuvin by Ciba-Geigy, Switzerland, and it is available in a lacquer form and applied as by painting or spraying. The ultra violet light is also available in such a form as to be introduced into the plastic of the panel by means of a coextrusion technique.

It will be appreciated by persons skilled in the art that the present invention is not limited by what has been shown and described hereinabove by way of example. The scope of the present invention is limited, rather, solely by the claims, which follow.

We claim:

1. A constructional panel having first and second edge portions arranged for interconnection with respective second and first edge portions of similar panels, said first and second edge portions being configured for mating engagement at at least two locations, said first edge portion including a generally flat portion arranged to permit attachment of the edge portion to an external support by a fastener extending through said flat portion, the mating engagement of said first and second edge portions being such that said generally flat portion and said fastener are covered by said second edge portion, and wherein said panel comprises first and second spaced apart portions defining respective first and second outer surfaces lying in respective first and second planes, said first edge portion having a third outer surface substantially coplanar with said first surface and said second edge portion having a fourth outer surface substantially coplanar with said second outer surface, and said first edge portion defines a first protrusion defining said third outer surface, said first protrusion also defining first and second locking portions, and said second edge portion defines a second protrusion defining said fourth outer surface and a pair of spaced apart teeth mounted onto said second protrusion so as to extend transversely to said second plane and towards said first plane and so as to be lockably engageable with said first and second locking portions, thereby to define said at least two locations.

2. Apparatus according to claim 1, and wherein said first and second locking portions are defined by a pair of spaced apart teeth mounted onto said first protrusion so as to extend transversely to said first plane and towards said second plane and a pair of protrusions mounted in spaced relation to said pair of spaced apart teeth, such that each locking portion is defined by one of said spaced apart teeth, an adjacent one of said pair of protrusions, and an intervening transverse surface.

3. Apparatus according to claim 2 and wherein the resistance of said first and second edge portions to decoupling as a result of relative rotation thereof is at least equal to the resistance to moments of said constructional and similar panels.

4. Apparatus according to claim 2, and wherein the attachment of the edge portion to the external support is substantially impermeable to the passage of liquids.

5. Apparatus according to claim 1 and wherein the resistance of said first and second edge portions to decoupling as a result of relative rotation thereof is at least equal to the resistance to moments of said constructional and similar panels.

6. Apparatus according to claim 5, and wherein the attachment of the edge portion to the external support is substantially impermeable to the passage of liquids.

7. Apparatus according to claim 1, and wherein the attachment of the edge portion to the external support is substantially impermeable to the passage of liquids.

8. Apparatus according to claim 1, and being resistant to ultra violet radiation.

9. A panel construction comprising:

a plurality of constructional panels, each having first and second edge portions arranged for interconnection with respective second and first edge portions of similar panels, said first and second edge portions being configured for mating engagement at at least two locations, said first edge portion including a generally flat portion arranged to permit attachment of the edge portion to an external support; and a plurality of fasteners extending through said flat portions of said plurality of constructional panels and mounting them onto an external support, adjacent panels being in mating engagement being such that said generally flat portion and said fastener are covered by said second edge portion, and wherein each panel comprises first and second spaced apart portions defining respective first and second outer surfaces lying in respective first and second planes, said first edge portion having a third outer surface substantially coplanar with said first surface and said second edge portion having a fourth outer surface substantially coplanar with said second outer surface, and said first edge portion defines a first protrusion defining said third outer surface, said first protrusion also defining first and second locking portions, and said second edge portion defines a second protrusion defining said fourth outer surface and a pair of spaced apart teeth mounted onto said second protrusion so as to extend transversely to said second plane and towards said first plane and so as to be lockably engageable with said first and second locking portions, thereby to define said at least two locations.

10. Apparatus according to claim 9 and wherein the resistance of said first and second edge portions to decoupling as a result of relative rotation thereof is at least equal to the resistance to moments of said constructional and similar panels.

11. Apparatus according to claim 9, and wherein the attachment of the edge portion to the external support is substantially impermeable to the passage of liquids.

12. Apparatus according to claim 9 and wherein said panels define substantially parallel, flat, outward-facing surfaces.

13. Apparatus according to claim 9, and being resistant to ultra violet radiation.

* * * * *